United States Patent
Gazarek

(10) Patent No.: US 8,104,781 B2
(45) Date of Patent: Jan. 31, 2012

(54) WHEELED TILTING APPARATUS

(76) Inventor: Dennis Gazarek, Ajax (CA)

( * ) Notice: Subject to any disclaimer, the term of this patent is extended or adjusted under 35 U.S.C. 154(b) by 0 days.

(21) Appl. No.: 12/591,651

(22) Filed: Nov. 25, 2009

(65) Prior Publication Data
US 2010/0127471 A1 May 27, 2010

(30) Foreign Application Priority Data
Nov. 26, 2008 (CA) ...................................... 2645252

(51) Int. Cl.
*B60G 3/18* (2006.01)
(52) U.S. Cl. .................................................. 280/124.141
(58) Field of Classification Search ............ 280/124.134,
280/124.135, 124.125, 124.136, 124.145,
280/124.15, 124.103, 5.509, 5.506, 5.507,
280/124.141
See application file for complete search history.

(56) References Cited

U.S. PATENT DOCUMENTS

| | | | | |
|---|---|---|---|---|
| 4,854,603 A * | 8/1989 | Scaduto | ............... | 280/124.107 |
| 6,267,387 B1 * | 7/2001 | Weiss | ........................... | 280/5.52 |
| 6,637,758 B2 * | 10/2003 | Woo | ........................... | 280/5.521 |
| 7,407,173 B2 * | 8/2008 | Walker | ..................... | 280/124.134 |
| 7,712,748 B2 * | 5/2010 | Deal et al. | ................... | 280/5.521 |
| 2005/0248115 A1 * | 11/2005 | Huhmarkangas et al. | ..................... | 280/124.111 |

* cited by examiner

*Primary Examiner* — Faye M. Fleming

(57) ABSTRACT

The apparatus has two tilting wheels which, when attached to a two-wheeled vehicle such as a motorcycle or a scooter, allows the vehicle to tilt into a curve notwithstanding the addition of the two wheels. The apparatus includes a frame, a pair of wheel supports and a pair of wheels each rotatable about a separate wheel support. A pair of links interconnect the frame with the wheel supports. The apparatus includes a rocker pivotally connected to the frame and a pair of transverse arms each pivotal about a separate wheel support and the rocker. Each transverse arm has a coil spring for biasing the wheel support and rocker apart. When a vehicle equipped with the apparatus rounds a curve, the frame tilts in the direction of the curve with like tilting of the wheels of the apparatus.

22 Claims, 5 Drawing Sheets

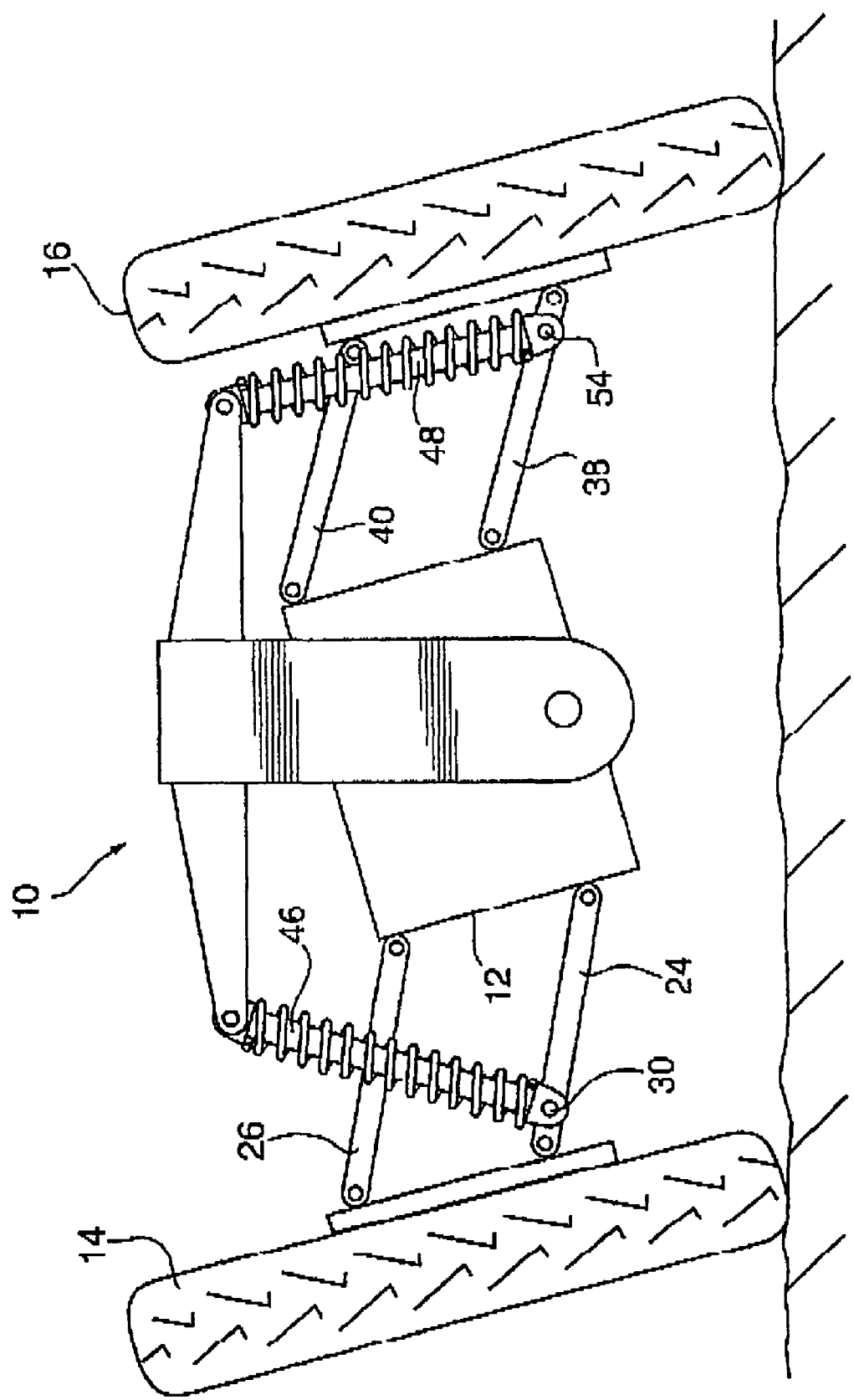

WHEELED TILTING APPARATUS

This application claims priority pursuant to 35 U.S.C. 119 based on Canadian application No. 2,645,252, filed Nov. 26, 2008, which application is incorporated herein by reference in its entirety.

FIELD OF THE INVENTION

This invention relates to tilting apparatus for wheels and more particularly to an apparatus which is intended to be attached to a vehicle and which has wheels which tilt as the vehicle travels over a curve in a road.

BACKGROUND OF THE INVENTION

The wheels of a two-wheeled vehicle such as a motorcycle or a scooter tilt as the vehicle is driven on a curve in a road if the driver of the vehicle shifts his weight into the curve. In fact, part of the enjoyment which the driver experiences from such a vehicle is the way the vehicle tilts as he shifts his weight into the curves of a winding road.

Vehicles having more than two wheels do not tilt in the same way. For example, a three-wheeled vehicle such as a motorcycle with a side-mounted wheeled-compartment for a passenger does not tilt as the vehicle rounds a curve unless the vehicle is travelling at an excessive speed. When the vehicle travels at such speed and it rounds a curve on the side opposite the passenger compartment, the wheels of the motor cycle tilt but as they do, the wheel of the passenger compartment lifts off the road. The vehicle then becomes unstable and difficult if not impossible to control.

Vehicles having four or more wheels generally do not respond to the shifting of a driver's weight because they are too heavy. If however the vehicle is light enough to respond, the vehicle too becomes unstable in the same way as a three-wheeled vehicle.

SUMMARY OF THE INVENTION

I have invented an apparatus which has two tilting wheels and which, when attached to a two-wheeled vehicle such as a motorcycle or a scooter, allows the wheels of the vehicle to continue to tilt. For example, the swing arm or rear fork of a motorcycle can be removed and my apparatus can be bolted to the existing swing arm mounting points. My apparatus accordingly converts a two-wheeled vehicle into a four-wheeled vehicle in which all four wheels tilt as the vehicle rounds a curve. A motorcycle or a scooter to which the apparatus is attached becomes more stable and hence easier to control since it does not tip over when it is stationary. My apparatus does not, however, detract from the enjoyment which a driver derives from the tilting of the vehicle as it rounds curves.

My apparatus can alternatively be substituted for one of the wheels of a two-wheeled vehicle. The forward or rear wheel of a motorcycle or scooter can be removed and replaced by my apparatus so that the motorcycle or scooter has an additional third wheel.

Briefly, the apparatus of my invention includes: a frame; a pair of wheel supports; and a pair of wheels each rotatable about a separate wheel support. The apparatus also includes a pair of links each being pivotal about a separate wheel support and each being pivotal about the frame. A rocker is pivotal relative to the frame and a pair of transverse arms are each pivotal about a separate wheel support and the rocker. The frame, while travelling on the curve, tilts toward the direction of the curve with like tilting of the wheels.

The rocker has limiters which control the amount of tilting of the frame and the rate at which the frame leans. The limiters can be activated by the operator of the apparatus either manually or by power activation. The limiters can be metal stops, screw locks, friction brakes, lock pins, springs, dampers and so on.

DESCRIPTION OF THE DRAWINGS

The apparatus of the invention is described with reference to the accompanying drawings which all show views of the apparatus from the rear. In the drawings:

FIG. 2 is an elevation of the apparatus as it would appear when the vehicle is turning to the left;

Like reference characters refer to like parts throughout the description of the drawings.

DESCRIPTION OF PREFERRED EMBODIMENTS

Figure 1:
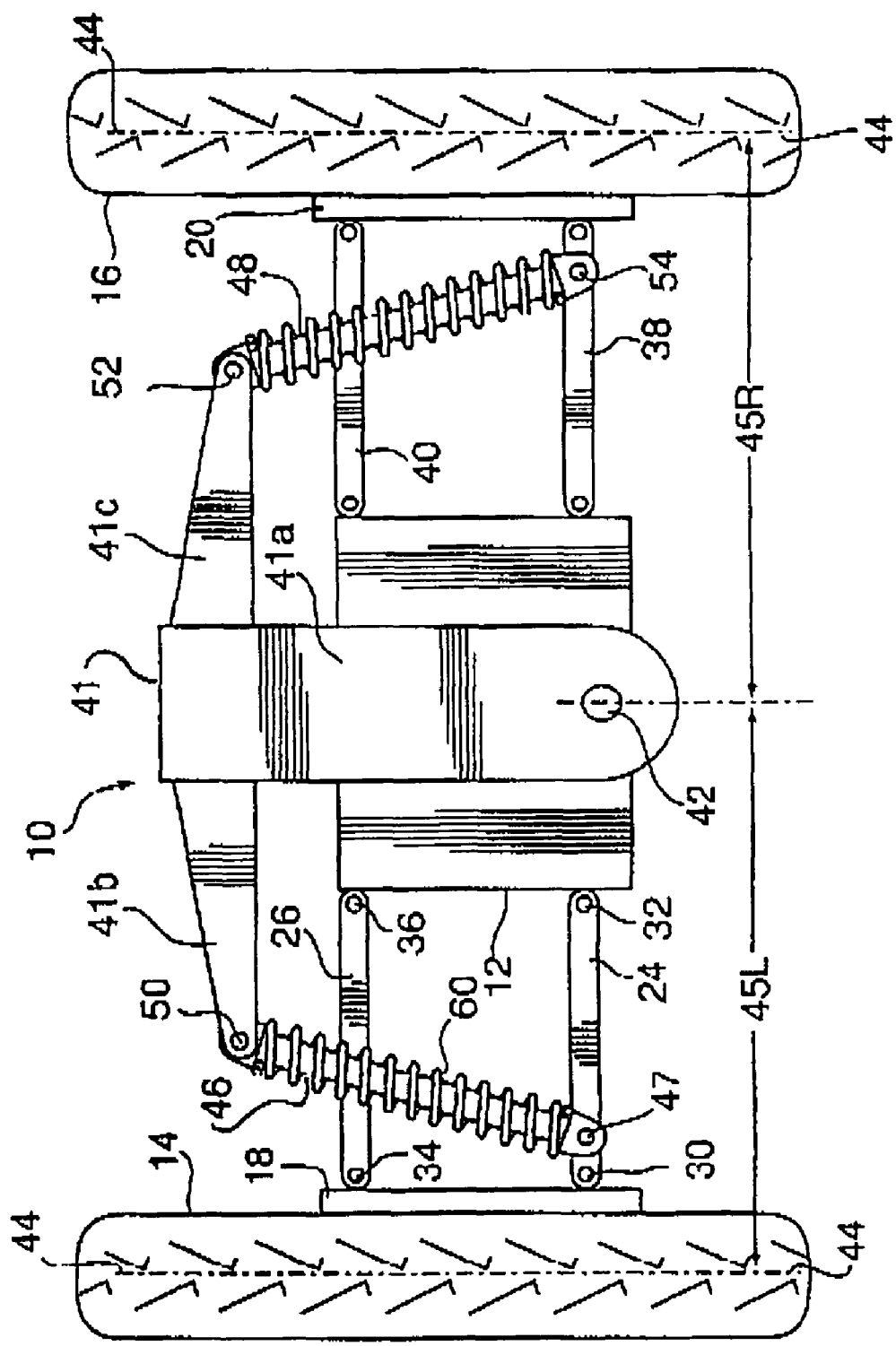
FIG. 1 is an elevation of the apparatus as it would appear when a vehicle to which it is attached is travelling straight forward or straight backward.

With reference to FIG. 1, the apparatus of the invention, identified generally by the numeral 10, includes a central rectangular frame 12 and a pair of axially aligned wheels 14, 16 on opposite sides of the frame. Each wheel is rotatably mounted to a separate wheel support 18, 20.

Wheel support 18 is connected to the frame by a pair of links 24, 26. The links are parallel to one another and are spaced apart vertically. The lower link 24 is pivotally attached at pivot point 30 to the wheel support and is pivotally attached at pivot point 32 to the frame while the upper link 26 is pivotally attached to the wheel support and frame at points 34 and 36 respectively. Similarly, wheel support 20 is attached to the opposite side of the frame by lower and upper parallel links 38, 40. The latter links are also pivotal about both the wheel support 20 and the frame.

A T-shaped rocker 41 is pivotally connected adjacent to the lower end of its central column 41a to the frame. The point of connection referred to below as a first pivot point 42 is spaced equidistantly from the longitudinal axes 44-44 of the wheels. Thus the distance between the first pivot point and the longitudinal axis of wheel 14, marked 45L, is the same as the distance between the first pivot point and the longitudinal axis of wheel 16, marked 45R.

Transverse arms 46, 48 are pivotally attached to the arms 41b,c of the rocker at pivot points 50,52 respectively. The two pivot points are referred to below as second and third pivot points. Transverse arm 46 extends downwardly and outwardly toward wheel 14 and is pivotally connected to lower link 24 at pivot point 47 while transverse arm 48 similarly extends downwardly and outwardly toward wheel 16 and is connected to lower link 38 at pivot point 54.

The point of connection of the upper end of transverse arm 46 to the rocker is higher than the point of connection of its lower end to lower link 24. In other words, upper pivot point 50 is at a higher elevation than lower pivot point 47. Similarly, the point of connection of the other transverse arm 48 to the rocker is higher than the point of connection of its lower end or pivot point 54 to lower link 38.

Transverse arm 46 is extendible from a retracted position to an extended position and is biased into the extended position by a coil spring 60 wound around the outer wall of the transerse arm. Transverse arm 48 is of the same construction. Preferably the two transverse arms are conventional shock absorbers. Alternatively, the transverse arms may be composed of two tubes, one within the other and slidable with respect to the other. One of those tubes is connected to the rocker while the other tube is connected to the wheel support and the two tubes are biased apart by resilient means such as a coil spring within the two tubes.

Figure 1A:
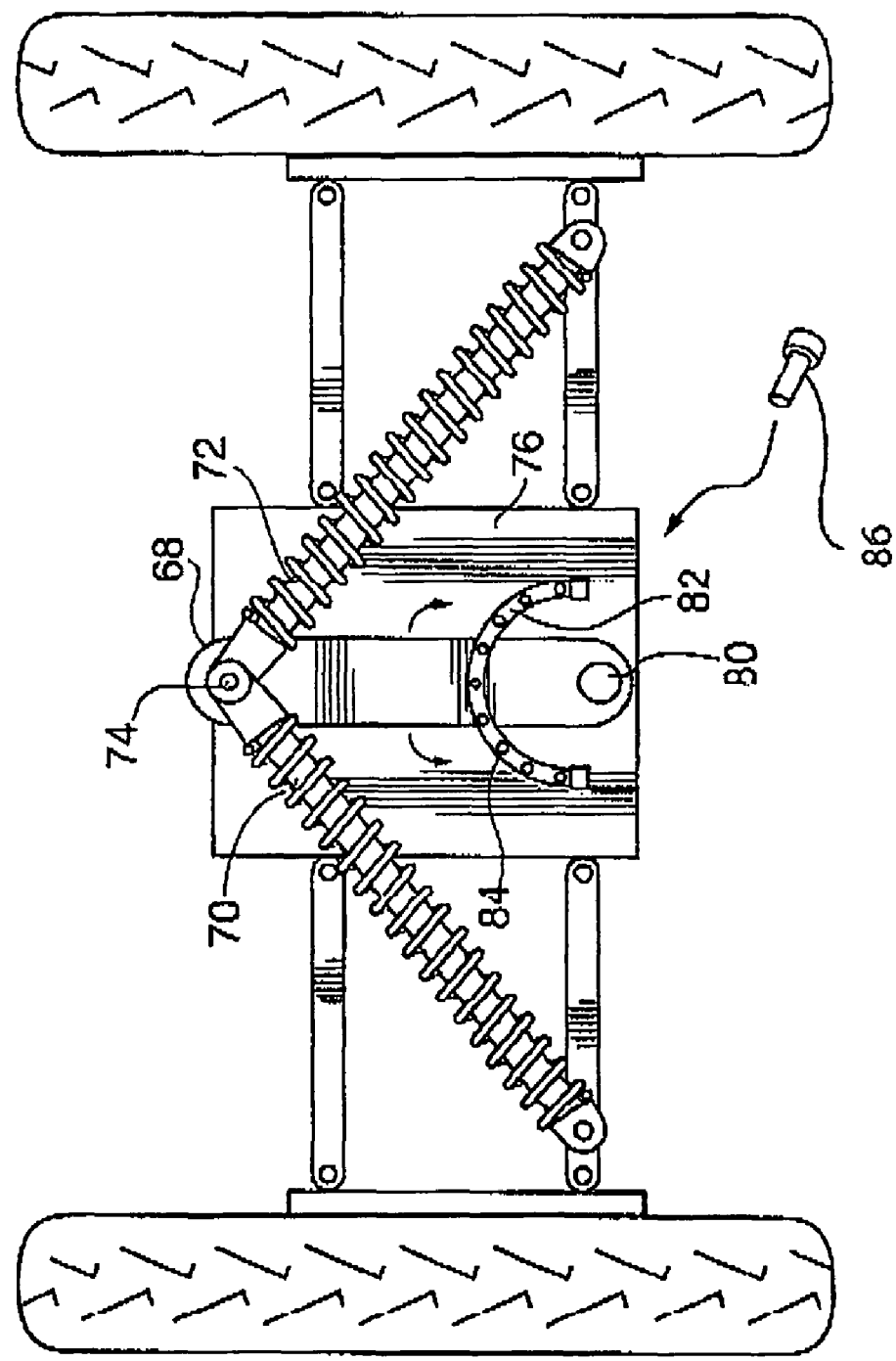
FIG. 1A is an elevation of a variation of the apparatus illustrated in FIG. 1.

With reference to FIG. 1A, the apparatus is similar to that illustrated in FIG. 1 however rocker 68 is in the shape of an "I" and is pivotally connected to transverse arms 70, 72 at only one pivot point 74 adjacent to its upper end. Thus the upper ends of the two transverse arms pivot about a common point and not two points which are spaced apart from one another as in the apparatus of FIG. 1.

The lower end of rocker 68 is pivotally connected to frame 76 at point 80. A U-shaped rod 82 is attached to the frame and is spaced apart from the rocker so that the rocker is free to pivot relative to the rod. The rod is provided with one or more threaded apertures 84 which selectively move into register with or open into a threaded aperture (not illustrated) formed in the rocker. A thumb screw 86 is receivable in any one of apertures 84 and when it is tightened, it engages the rocker and immobilizes it. The thumb screw accordingly functions to selectively prevent the rocker from pivoting.

Rod 82 and thumb screw 86 are only one of countless ways in which the rocker can be prevented from pivoting or its movement restricted both in the range in which it can pivot and the rate at which it can pivot. Other ways of doing so would readily occur to persons skilled in the mechanical field.

As indicated previously, the vehicle to which the apparatus of the invention is attached is preferably relatively light weight such as a motor cycle or scooter and it tilts as the driver of the vehicle shifts his weight.

The operation of the apparatus is as follows: with reference to FIG. 2, the vehicle is travelling on a curve to the left and the driver, as he leans into the curve, shifts his weight to the left. As he does so, the left side of the vehicle tilts downward and the right side of the vehicle rises. As the vehicle tilts so too does frame 12 and links 24, 26 cause the left wheel 14 to tilt to the left and links 38, 40 cause the right wheel to tilt in the same direction.

The apparatus of the invention accordingly causes both wheels to tilt in the direction of the curve thereby increasing the speed at which a driver can negotiate the curve without loss of control. By means of thumbscrew 86, the driver can adjust the degree to which the two wheels tilt. For example, in the apparatus of FIG. 1A, he can reduce the tilting of the wheels to zero by tightening the thumbscrew and by loosening the thumbscrew he can cause the wheels to tilt as little or as much as the vehicle itself.

Figure 3:
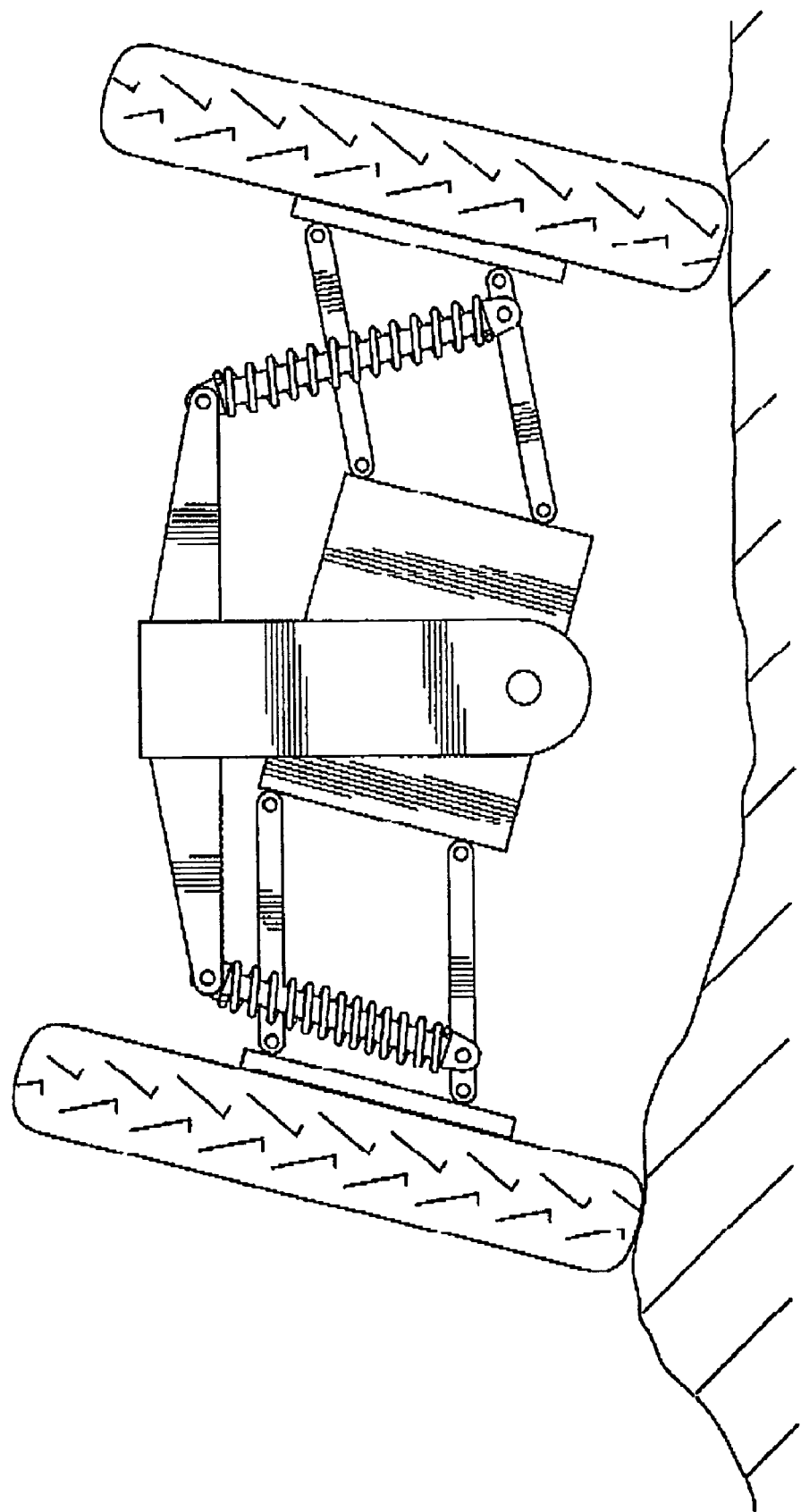
FIG. 3 is an elevation of the apparatus as it would appear when the vehicle is turning to the right.

FIG. 3 illustrates my apparatus as the vehicle travels on a curve to the right. The operation of the apparatus is opposite to that described with reference to FIG. 2.

Figure 4:
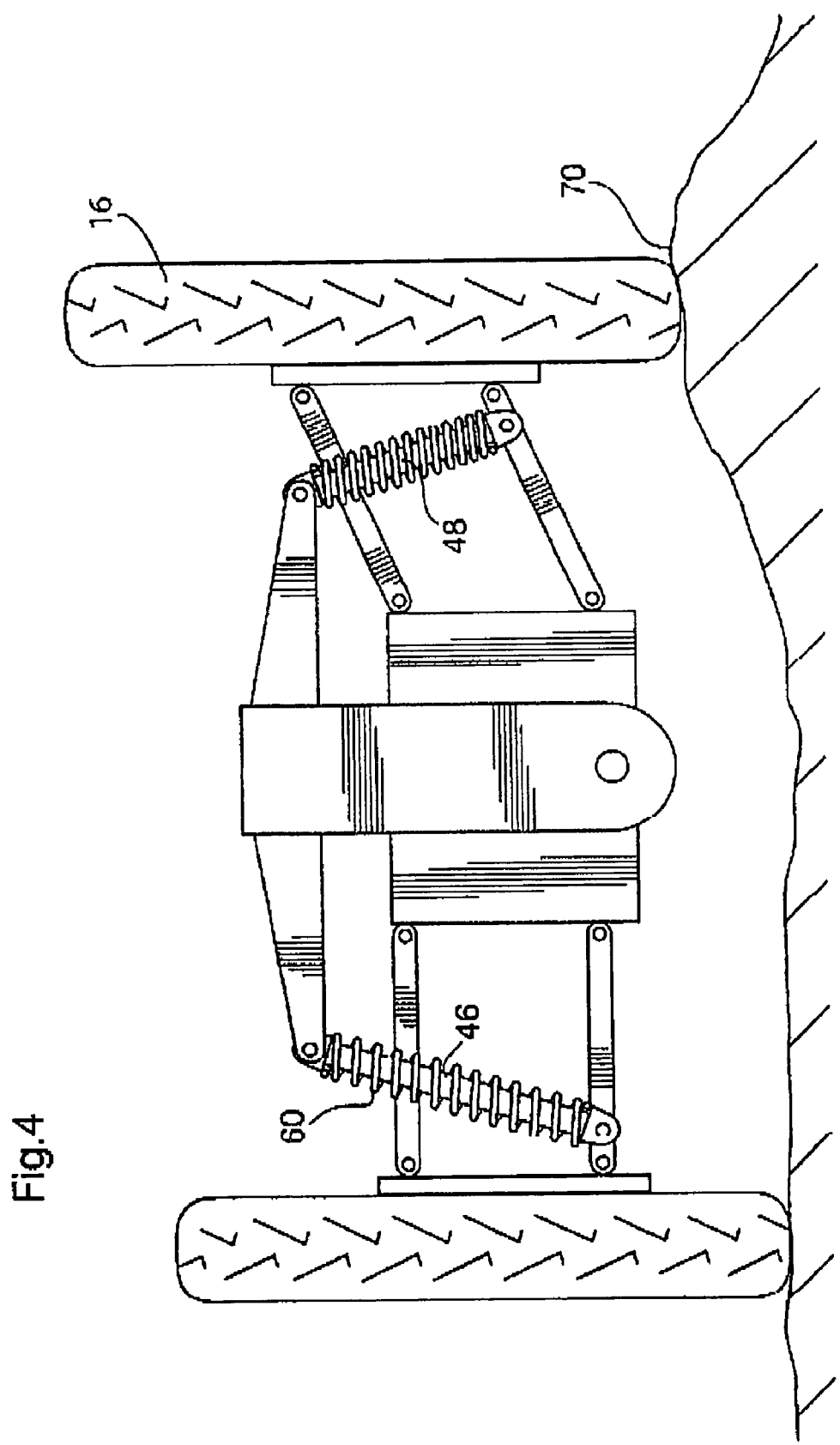
FIG. 4 is an elevation of the apparatus as it would appear when the vehicle was travelling over a hump in the road.

In FIG. 4, the right wheel 16 travels over a bump 70 in the road. The bump causes the wheel to rise and the right transverse arm 48 to apply a counterclockwise moment on the rocker. However the rocker does not pivot because the counter clockwise moment is resisted by the bias of coil spring 60 on the left transverse arm 46. The force which the bump applies on the right wheel causes the right transverse arm 48 to retract or shorten and both left and right wheels remain upright. Depending on the initial settings of the suspension, the wheel encountering the bump may or may not remain parallel to the other wheel.

It will be understood, of course, that modifications can be made in the structure of the apparatus of my invention without departing from the scope of the invention as defined in the appended claims. For example, power can be supplied to one or both of the wheels to drive them. An electric motor powered by a battery would be suitable for this purpose. It should also be noted that all components of the apparatus including the arms, rocker, pivots, connectors and links are adjustable to facilitate changes in various settings to allow the suspension to be made suitable to varying situations and conditions.

I claim:

1. A wheel-tilting apparatus for a vehicle, said apparatus including: a frame, a pair of wheel supports; a pair of wheels each rotatable about a separate said wheel support, a pair of links each pivotable about said frame and a separate said wheel support such that said frame, while traveling on a curve, tilts toward the direction of said curve and causes resulting tilting of said wheels; a rocker pivotal relative to said frame; a pair of transverse arms each pivotal about a separate said wheel support and said rocker and each having means for biasing said separate wheel support and said rocker apart.

2. The apparatus of claim 1 wherein each said transverse arm is pivotal about a separate point on said rocker, said points being spaced apart from each other.

3. The apparatus of claim 1 wherein both said transverse arms are pivotal about the same point on said rocker.

4. The apparatus of claim 1 wherein said wheels are axially aligned.

5. The apparatus of claim 1 wherein each said transverse arm is pivotally connected to a separate said link.

6. The apparatus of claim 1 further including means for selectively preventing said rocker from pivoting.

7. Wheel-tilting apparatus for a relatively light-weight vehicle, said apparatus including: a frame; a pair of wheel supports; a pair of axially aligned wheels each rotatable about a separate said wheel support, two pairs of lower and upper parallel links, each pair of said links being pivotal about lower and upper pivot points, respectively, on a separate said wheel support and each pair of said links being pivotal about said frame such that said frame, while travelling on a curve, tilting toward the direction of said curve with resulting tilting of said wheels; a rocker pivotal relative to said frame; a pair of transverse arms each pivotal about a lower pivot point on a separate said lower link and an upper pivot point on said rocker, each said transverse arm being extendible from a retracted position to an extended position and including resilient means for biasing said transverse arm into said extended position.

8. The apparatus of claim 7 wherein each said transverse arm is pivotal about a separate point on said rocker, said points being spaced apart from each other.

9. The apparatus of claim 7 wherein both said transverse arms are pivotal about the same point on said rocker.

10. The apparatus of claim 7 wherein said upper pivot point is at a higher elevation than that of the lower pivot point of each said transverse arm.

11. The apparatus of claim 7 including means for selectively preventing said rocker from pivoting.

12. A wheel-tilting apparatus for a vehicle, said apparatus including: a frame, a pair of wheel supports; a pair of wheels each rotatable about a separate said wheel support, a pair of links each pivotable about said frame and a separate said wheel support such that said frame, while traveling on a curve, tilts toward the direction of said curve and causes a resulting tilting of said wheels; a rocker pivotal relative to said frame; a pair of transverse arms each pivotal about a separate said wheel support and said rocker and each having means for biasing said separate wheel support and said rocker apart, and wherein said transverse arms are shock absorbers.

13. The apparatus of claim 12 wherein each said transverse arm is pivotal about a separate point on said rocker, said points being spaced apart from each other.

14. The apparatus of claim 12 wherein both said transverse arms are pivotal about the same point on said rocker.

15. The apparatus of claim 12 wherein said wheels are axially aligned.

16. The apparatus of claim 12 wherein each said transverse arm is pivotally connected to a separate said link.

17. The apparatus of claim 12 further including means for selectively preventing said rocker from pivoting.

18. Wheel-tilting apparatus for a relatively light-weight vehicle, said apparatus including: a frame; a pair of wheel supports; a pair of axially aligned wheels each rotatable about a separate said wheel support, two pairs of lower and upper parallel links, each pair of said links being pivotal about lower and upper pivot points, respectively, on a separate said wheel support and each pair of said links being pivotal about said frame such that said frame, while travelling on a curve, tilting toward the direction of said curve with resulting tilting of said wheels; a rocker pivotal relative to said frame; a pair of transverse arms each pivotal about a lower pivot point on a separate said lower link and an upper pivot point on said rocker, each said transverse arm being extendible from a retracted position to an extended position and including resilient means for biasing said transverse arm into said extended position.

19. The apparatus of claim 18 wherein each said transverse arm is pivotal about a separate point on said rocker, said points being spaced apart from each other.

20. The apparatus of claim 18 wherein both said transverse arms are pivotal about the same point on said rocker.

21. The apparatus of claim 18 wherein said upper pivot point is at a higher elevation than that of the lower pivot point of each said transverse arm.

22. The apparatus of claim 18 including means for selectively preventing said rocker from pivoting.

\* \* \* \* \*